(12) United States Patent
Loper et al.

(10) Patent No.: US 8,858,365 B2
(45) Date of Patent: Oct. 14, 2014

(54) MULTI-LAYER GOLF BALL CONSTRUCTION

(71) Applicant: Taylor Made Golf Company, Inc., Carlsbad, CA (US)

(72) Inventors: Eric Michael Loper, Carlsbad, CA (US); Dean A. Snell, San Marcos, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 113 days.

(21) Appl. No.: 13/719,077

(22) Filed: Dec. 18, 2012

(65) Prior Publication Data

US 2013/0165264 A1 Jun. 27, 2013

Related U.S. Application Data

(60) Provisional application No. 61/580,120, filed on Dec. 23, 2011.

(51) Int. Cl.
*A63B 37/04* (2006.01)
*A63B 37/00* (2006.01)
*C08G 61/08* (2006.01)
*C08F 283/14* (2006.01)

(52) U.S. Cl.
CPC ......... *A63B 37/0076* (2013.01); *A63B 37/0092* (2013.01); *C08G 2261/418* (2013.01); *A63B 37/0043* (2013.01); *C08G 61/08* (2013.01); *A63B 37/0046* (2013.01); *C08G 2261/3322* (2013.01); *A63B 37/0027* (2013.01); *C08F 283/14* (2013.01); *A63B 37/0037* (2013.01); *A63B 37/0077* (2013.01); *A63B 37/0088* (2013.01); *A63B 37/0034* (2013.01); *A63B 37/0033* (2013.01); *A63B 37/0064* (2013.01); *A63B 37/0069* (2013.01); *A63B 37/0045* (2013.01); *A63B 37/0049* (2013.01); *A63B 37/0031* (2013.01); *A63B 37/0024* (2013.01); *A63B 37/0062* (2013.01); *A63B 37/0065* (2013.01); *A63B 37/0086* (2013.01); *A63B 37/0039* (2013.01); *A63B 37/0051* (2013.01)
USPC .......................................... 473/373; 473/376

(58) Field of Classification Search
USPC ................... 473/371–374, 376–378
See application file for complete search history.

(56) References Cited

U.S. PATENT DOCUMENTS

| | | |
|---|---|---|
| 3,264,272 A | 8/1966 | Rees |
| 3,388,186 A | 6/1968 | Kray et al. |
| 3,465,059 A | 9/1969 | Seven et al. |
| 3,634,543 A | 1/1972 | Sherman |
| 4,035,438 A | 7/1977 | Nielinger et al. |
| 4,104,216 A | 8/1978 | Clampitt |
| 4,217,430 A | 8/1980 | Starkweather et al. |
| 4,404,325 A | 9/1983 | Mason et al. |
| 4,884,814 A | 12/1989 | Sullivan |
| 4,955,966 A | 9/1990 | Yuki et al. |

(Continued)

FOREIGN PATENT DOCUMENTS

| | | |
|---|---|---|
| EP | 342244 | 11/1989 |
| JP | 48-07057 | 9/1973 |

(Continued)

*Primary Examiner* — Gene Kim
*Assistant Examiner* — John E Simms, Jr.
(74) *Attorney, Agent, or Firm* — Klarquist Sparkman LLP.

(57) ABSTRACT

Disclosed herein is a six piece golf ball wherein each part of the golf ball has certain characteristics.

9 Claims, 3 Drawing Sheets

(56) References Cited

U.S. PATENT DOCUMENTS

| | | |
|---|---|---|
| 5,130,372 A | 7/1992 | Lences et al. |
| 5,306,760 A | 4/1994 | Sullivan |
| 5,312,857 A | 5/1994 | Sullivan |
| 5,324,783 A | 6/1994 | Sullivan |
| 5,484,870 A | 1/1996 | Wu |
| 5,688,869 A | 11/1997 | Sullivan |
| 5,691,066 A | 11/1997 | Rajagopalan |
| 5,692,974 A | 12/1997 | Wu et al. |
| 5,789,475 A | 8/1998 | Chen |
| 5,886,103 A | 3/1999 | Bellinger et al. |
| 5,948,864 A | 9/1999 | Rajagopalan |
| 5,973,046 A | 10/1999 | Chen et al. |
| 6,037,419 A | 3/2000 | Takesue et al. |
| 6,100,321 A | 8/2000 | Chen |
| 6,117,024 A | 9/2000 | Dewanjee |
| 6,207,784 B1 | 3/2001 | Rajagopalan |
| 6,329,458 B1 | 12/2001 | Takesue et al. |
| H2036 H | 7/2002 | Bush |
| 6,562,906 B2 | 5/2003 | Chen |
| 6,610,812 B1 | 8/2003 | Wu et al. |
| 6,616,552 B2 | 9/2003 | Takesue et al. |
| 6,653,403 B2 | 11/2003 | Dalton et al. |
| 6,762,273 B2 | 7/2004 | Dewanjee |
| 6,852,784 B2 | 2/2005 | Sullivan |
| 6,894,098 B2 | 5/2005 | Rajagopalan et al. |
| 6,903,178 B2 | 6/2005 | Wu et al. |
| 6,951,519 B2 | 10/2005 | Dewanjee et al. |
| 7,534,838 B2 | 5/2009 | Kim et al. |
| 7,767,759 B2 | 8/2010 | Kim |
| 7,915,348 B2 | 3/2011 | Kim et al. |
| 8,715,113 B2 * | 5/2014 | Loper et al. ............... 473/376 |
| 2003/0050373 A1 | 3/2003 | Chen |
| 2003/0119989 A1 * | 6/2003 | Ladd et al. ............... 525/193 |
| 2003/0158312 A1 | 8/2003 | Chen |
| 2004/0059062 A1 | 3/2004 | Kim |
| 2004/0236030 A1 | 11/2004 | Kim et al. |
| 2004/0248669 A1 | 12/2004 | Kim et al. |
| 2005/0261424 A1 | 11/2005 | Snell et al. |
| 2005/0288446 A1 | 12/2005 | Zieske et al. |
| 2006/0014898 A1 | 1/2006 | Kim et al. |
| 2006/0030427 A1 | 2/2006 | Kim et al. |
| 2006/0166761 A1 | 7/2006 | Kim et al. |
| 2006/0166762 A1 | 7/2006 | Kim et al. |
| 2006/0172823 A1 | 8/2006 | Loper et al. |
| 2006/0247074 A1 | 11/2006 | Kim et al. |
| 2007/0015605 A1 | 1/2007 | Kim et al. |
| 2007/0100085 A1 | 5/2007 | Kim et al. |
| 2007/0142568 A1 | 6/2007 | Kim et al. |
| 2007/0232756 A1 | 10/2007 | Kim et al. |
| 2007/0238552 A1 | 10/2007 | Kim et al. |
| 2008/0090678 A1 | 4/2008 | Kim et al. |
| 2008/0176677 A1 | 7/2008 | Snell et al. |
| 2008/0214326 A1 | 9/2008 | Kim et al. |
| 2008/0274825 A1 | 11/2008 | Kim et al. |
| 2009/0111611 A1 * | 4/2009 | Kimura et al. ............... 473/373 |
| 2009/0163298 A1 | 6/2009 | Kim |
| 2009/0170633 A1 * | 7/2009 | Kim et al. ............... 473/371 |
| 2009/0170634 A1 * | 7/2009 | Loper et al. ............... 473/373 |
| 2009/0176601 A1 * | 7/2009 | Snell et al. ............... 473/376 |
| 2009/0191981 A1 * | 7/2009 | Kim et al. ............... 473/373 |
| 2009/0233733 A1 * | 9/2009 | Watanabe et al. ............... 473/373 |
| 2010/0048326 A1 * | 2/2010 | Kimura et al. ............... 473/373 |
| 2010/0298066 A1 | 11/2010 | Kim |
| 2011/0152010 A1 | 6/2011 | Kim et al. |
| 2011/0300968 A1 * | 12/2011 | Ryu et al. ............... 473/373 |
| 2012/0157232 A1 | 6/2012 | Kim et al. |

FOREIGN PATENT DOCUMENTS

| | | |
|---|---|---|
| JP | 59-157122 | 9/1984 |
| JP | 04-001231 | 1/1992 |
| JP | 05-007635 | 1/1993 |
| JP | 06-313075 | 11/1994 |
| JP | 09-227737 | 9/1997 |
| JP | 10-127822 | 5/1998 |
| JP | 10-137364 | 5/1998 |
| JP | 10-231400 | 9/1998 |
| JP | 11-299933 | 11/1999 |
| JP | 2003-339910 | 12/2003 |
| JP | 2005-066040 | 3/2005 |
| JP | 2005-137743 | 6/2005 |
| WO | WO 01/42324 | 11/2000 |

* cited by examiner

MULTI-LAYER GOLF BALL CONSTRUCTION

CROSS-REFERENCE TO RELATED APPLICATION

This application claims the benefit of U.S. Provisional Application No. 61/580,120, which was filed on Dec. 23, 2011, and is incorporated herein by reference in its entirety.

BACKGROUND OF THE INVENTION

The present invention relates to sports equipment in general and more particularly to golf balls. So called "multi-layer" golf balls generally include at least three "pieces"—a central core and at least two layers surrounding the core. A multi-layer ball can offer several advantages and disadvantages. However, the specific advantages and disadvantages potentially provided by a specific contemplated design are unpredictable due to the complex nature of the physical interaction between the various materials used in the core and the layers.

SUMMARY

Disclosed herein is a six piece golf ball having a core having a center and an outer surface and having a diameter of 0.50 to 1.62 in, a PGA compression of less than or equal to 30, a flex modulus of less than or equal to 15 kpsi, and a Shore D hardness as measured at the outer surface of less than or equal to 60. The ball also has an inner mantle layer having a thickness of 0.010 to 0.400 inches, a PGA compression as measured on the golf ball precursor of less than or equal to 35, a flex modulus of 2 to 25 kpsi and a Shore D hardness as measured on the ball of greater than or equal to 25. The ball also has an intermediate mantle layer having a thickness of 0.010 to 0.400 inches, a PGA compression as measured on the golf ball precursor of less than or equal to 35, a flex modulus of 2 to 30 kpsi and a Shore D hardness as measured on the ball of greater than or equal to 25. The ball also has an outer mantle layer having a thickness of 0.010 to 0.400 inches, a PGA compression as measured on the golf ball precursor of greater than or equal to 25, a flex modulus of 10 to 50 kpsi and a Shore D hardness as measured on the ball of greater than or equal to 25. The ball also has an inner cover layer having a thickness of 0.010 to 0.400 inches, a PGA compression as measured on the golf ball precursor of greater than or equal to 60, a flex modulus of 50 to 80 kpsi and a Shore D hardness as measured on the ball of greater than or equal to 55. The ball also has an outer cover layer having a thickness of 0.015 to 0.100 inches, a PGA compression as measured on the golf ball precursor of greater than or equal to 60, a flex modulus of 2 to 30 kpsi and a Shore D hardness as measured on the ball of 30 to 75.

DESCRIPTION OF RELATED ART

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, three-piece or multi-layered golf balls. One-piece balls are molded from a homogeneous mass of material with a dimple pattern molded thereon. One-piece balls are inexpensive and very durable, but typically do not provide great distance because of relatively high spin and low velocity. Two-piece balls are made by molding a cover around a solid rubber core. These are the most popular types of balls in use today. In attempts to further modify the ball performance, especially in terms of the distance such balls travel, and the spin and the feel transmitted to the golfer through the club on striking the ball, the basic two piece ball construction has been further modified by the introduction of additional layers between the core and outer cover layer. If one additional layer is introduced between the core and outer cover layer a so called "three-piece ball" results, if two additional layers are introduced between the core and outer cover layer, a so called "four-piece ball" results, and so on.

Golf ball covers were previously made from balata rubber which was favored by some players because the softness of the cover allowed them to achieve spin rates sufficient to allow more precise control of ball direction and distance, particularly on shorter approach shots. However balata-covered balls, although exhibiting high spin and soft feel, were often deficient in terms of the durability of the cover which had a propensity to shear and also the velocity of the ball when it leaves the club face (which in turn affects the distance the ball travels).

The distance a golf ball travels is directly related to the coefficient of restitution ("C.O.R.") of the ball. The coefficient of restitution of a one-piece golf ball is in part a function of the ball's composition. In a two-piece or a multi-layered golf ball, the coefficient of restitution is a function of the properties of the core, the cover and any additional layer. While there are no United States Golf Association ("USGA") limitations on the coefficient of restitution values of a golf ball, the USGA requires that the golf ball cannot exceed an initial velocity of 255 feet/second. As a result, golf ball manufacturers generally seek to maximize the coefficient of restitution of a ball without violating the velocity limitation.

Accordingly, a variety of golf ball constructions have been developed in an attempt to provide spin rates and a feel approaching those of balata covered balls, while also providing a golf ball with a higher durability and overall distance. This has resulted in the emergence of balls, which have a solid rubber core, a cover, and one or more so called intermediate layers, as well as the application of new materials to each of these components.

The emergence of multi-piece ball constructions have also allowed ball manufacturers to tailor ball performance in terms of spin and velocity depending on the nature of the shot being played. For instance when hit by a driver, the ball experiences a high impact condition due to the higher velocity of the driver swing. Conversely for relatively short wedge shots, the ball is typically subjected to a much lower impact condition. Shots made with mid to long irons, for example a 5 iron, tend to subject the ball to an intermediate impact condition.

In addition, recent changes to the allowable groove configurations in iron golf clubs by the USGA has resulted in the newer iron grooves imparting less spin to a given golf ball by a factor of 10-40% depending on the type of shot and club. All other things being equal one method of compensating for this loss of spin on wedge shots is to increase the capacity of the ball to generate spin on impact. Typically this has been accomplished by making the outer cover layer softer (as in the balata covers) and inserting an additional harder inner cover layer immediately below the soft outer cover layer which on impact causes the soft outer cover layer to be pinched between the hard club face and hard inner cover layer, generating even more spin. However although this combination of a soft outer cover and a harder inner cover results in additional spin on wedge shots, it also results in increased spin on the ball when struck by a driver. An increase in the amount of side spin can, depending on its direction, cause the ball trajectory to veer left (hook) or right (slice). One method to compensate for this is to lower the core compression which reduces the spin rate on a driver shot (the high velocity of the impact causing the core to compress) but this has a lower effect on the wedge spin rate as the lower velocity impact of a wedge shot does not compress the golf ball core to the same degree on impact as a higher velocity driver shot.

However, the degree to which the core compression can be lowered to compensate for the increase in spin generated by the combination of a soft outer cover and hard inner cover layer is in turn determined by the durability of the hard inner cover layer which, in the absence of a hard core to support it will, in some ball constructions, have a tendency to crack or fail on a high velocity driver impact. In addition, there still remains the problem of imparting too much spin to mid to low iron shots which in turn results in loss of distance. Thus there remains a need for ball constructions which are able to impart high spin on wedge shots while minimizing the spin generated on driver shots and which also have sufficient performance not just in terms of durability but also minimizing spin and thus maximizing distance on long iron and mid iron shots. As in all golf shots, it would also be highly desirable if the new ball constructions are also able to deliver improved feel transmitted to the golfer when he impacts the ball, which is in turn obtained by controlling the sound performance of the golf ball impact, both in terms of the frequency of the impact sound in Hz, and the sound pressure level generated on impact in decibels.

We have now found that a six-piece ball construction of the present invention having a combination of a soft core with a compression of less than 35 PGA combined with a hard inner cover layer (having a hardness of at least 65 Shore D, and a flexural modulus of at least 65 kpsi) and a soft outer cover layer having a hardness of 50-60 Shore D and a flex modulus of 5-15 kpsi with three additional mantle layers of the required physical properties and materials of construction between the core and hard inner cover layer (the inner mantle., intermediate mantle and outer mantle layers respectively) results in a golf ball with the required durability and high wedge spin, low driver spin, low mid iron spin and the required sound and hence feel performance.

SUMMARY

DETAILED DESCRIPTION OF INVENTION

Figure 1:
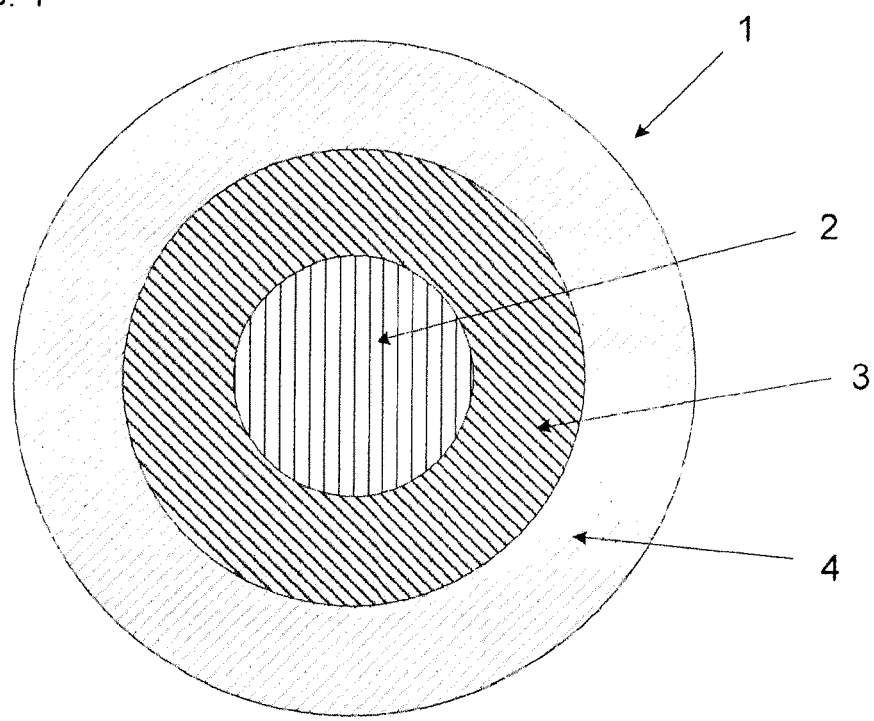
FIG. 1 illustrates a three-piece golf ball 1 comprising a solid center or core 2, a mantle layer 3, and an outer cover layer 4.
Figure 2:
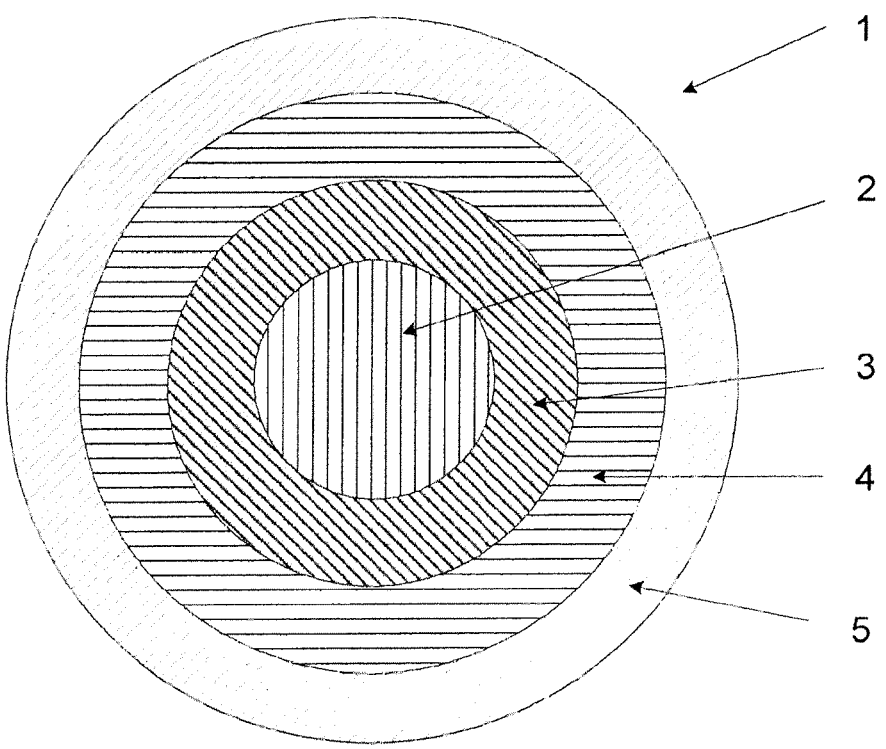
FIG. 2 illustrates a four-piece golf ball 1 comprising a core 2, and an outer cover layer 5, an inner mantle layer 3, and an outer mantle layer 4.
Figure 3:
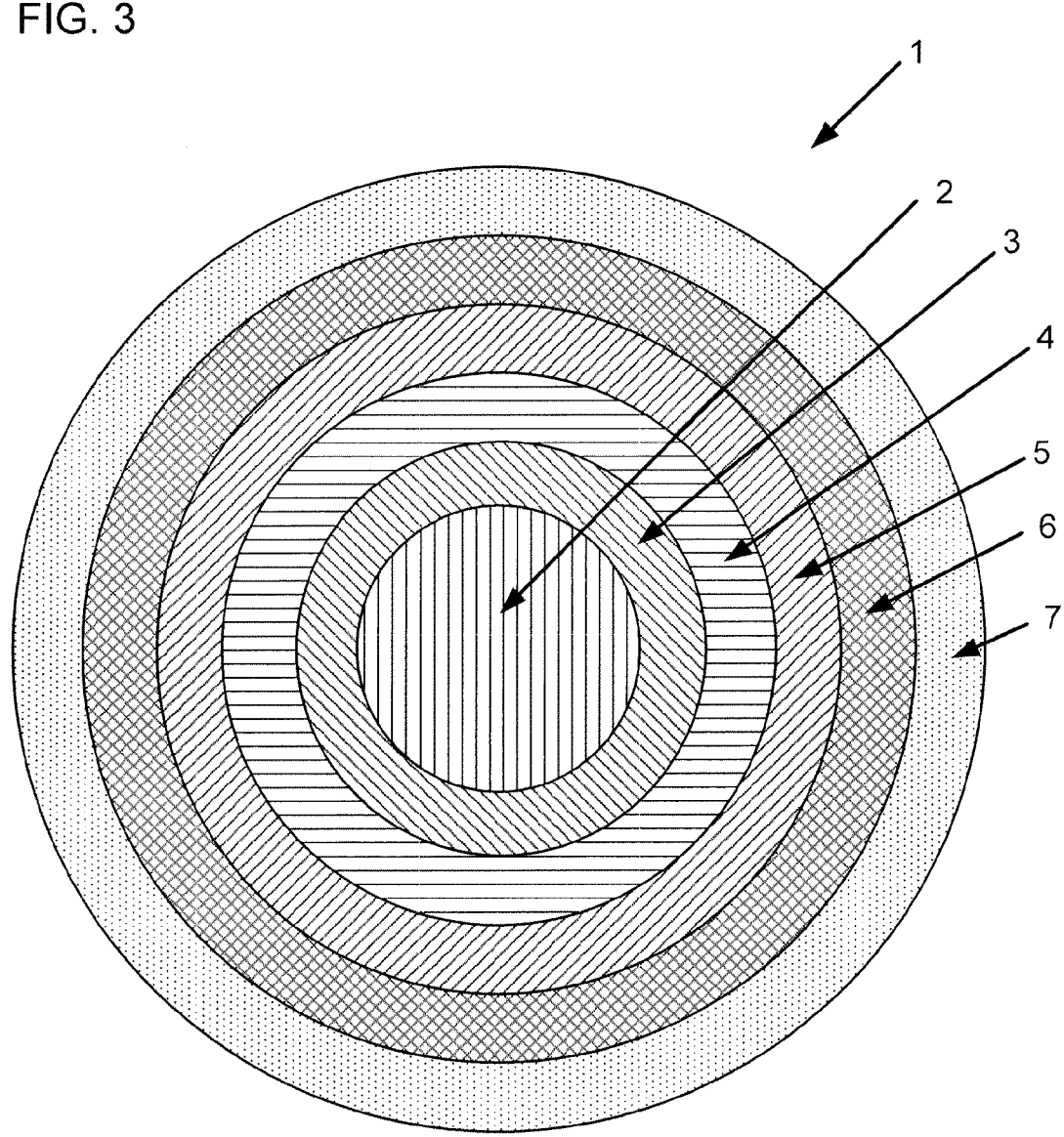
FIG. 3 illustrates a six-piece golf ball 1 comprising a core 2, and an outer cover layer 5, an inner mantle layer 3, an outer mantle layer 4, an intermediate mantle layer 6 and an inner cover layer 7.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc. are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

As used herein, the term "block copolymer" is intended to mean a polymer comprising two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively.

The term "core" is intended to mean the elastic center of a golf ball. The core may be a unitary core having a center it may have one or more "core layers" of elastic material, which are usually made of rubbery material such as diene rubbers. The core may also be of a so called "dual core" construction when it is made of up of (i) an interior spherical center component formed from a thermoset material, preferably polybutadiene and (ii) a second region formed around the interior spherical center component, also formed from a thermoset material, and preferably butadiene. Although the two core regions which constitute the dual core may both be formed form polybutadiene, each region preferably has different physical properties such as resilience, hardness or modulus resulting from the use of different crosslinking packages and/or processing conditions.

The term "outer cover layer" is intended to mean the outermost layer of the golf ball; this is the layer that is directly in contact with paint and/or ink on the surface of the golf ball. If the cover consists of two or more layers, only the outermost layer is designated the outer cover layer, and the next layer inward to the direction of the core is known as the inner cover layer.

The term "fiber" as used herein is a general term for which the definition given in *Engineered Materials Handbook*, Vol. 2, "Engineering Plastics", published by A.S.M. International, Metals Park, Ohio, USA, is relied upon to refer to filamentary materials with a finite length that is at least 100 times its diameter, which is typically 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned are also considered to be encompassed by the invention. Thus, the terms "fibers" and "fiber segments" are used herein. In the claims appearing at the end of this disclosure in particular, the expression "fibers or fiber segments" and "fiber elements" are used to encompass both fibers and fiber segments.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "mantle layer" is intended to mean any layer(s) in a golf ball disposed between the core (and any core layers) and the innermost cover layer. Should a ball have three mantle layers, these may be distinguished as "inner mantle layer" which refers to the mantle layer nearest the core and furthest from the outer cover layer, as opposed to the "outer mantle layer" which refers to the mantle layer furthest from the core and closest to the outer cover layer, and as opposed to the "intermediate mantle layer" which refers to the mantle layer between the inner mantle layer and the outer mantle layer.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent. The term "highly neutralized" is intended to mean an ionomer with a degree of neutralization of greater than 50 percent. The term "fully neutralized" is intended to mean an ionomer with a degree of neutralization of 100 percent.

The term "prepolymer" as used herein is intended to mean any polymeric material that can be further processed to form a final polymer material of a manufactured golf ball, such as, by way of example and not limitation, a polymerized or partially polymerized material that can undergo additional processing, such as crosslinking.

The term "sports equipment" refers to any item of sports equipment such as sports clothing, boots, sneakers, clogs, sandals, slip on sandals and shoes, golf shoes, tennis shoes, running shoes, athletic shoes, hiking shoes, skis, ski masks, ski boots, cycling shoes, soccer boots, golf clubs, golf bags, and the like.

The term "thermoplastic" as used herein is intended to mean a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinked, such as during a compression molding step to form a final structure.

The term "thermoset" as used herein is intended to mean a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules crosslink with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a prepared by reaction of a diisocyanate with a polyol, and optionally addition of a chain extender.

The term "thermoplastic polyurea" as used herein is intended to mean a material prepared by reaction of a prepared by reaction of a diisocyanate with a polyamine, with optionally addition of a chain extender.

The term "thermoset polyurethane" as used herein is intended to mean a material prepared by reaction of a diisocyanate with a polyol (or a prepolymer of the two), and a curing agent.

The term "thermoset polyurea" as used herein is intended to mean a material prepared by reaction of a diisocyanate with a polyamine (or a prepolymer of the two) and a curing agent.

The term "unimodal polymer" refers to a polymer comprising one main fraction and more specifically to the form of the polymers molecular weight distribution curve, i.e., the molecular weight distribution curve for the total polymer product shows only a single maximum.

The term "urethane prepolymer" as used herein is intended to mean the reaction product of diisocyanate and a polyol.

The term "urea prepolymer" as used herein is intended to mean the reaction product of a diisocyanate and a polyamine.

The term "zwitterion" as used herein is intended to mean a form of the compound having both an amine group and carboxylic acid group, where both are charged and where the net charge on the compound is neutral.

The present invention can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred; however diameters anywhere in the range of from 1.70 to about 2.0 inches can be used. Oversize golf balls with diameters above about 1.760 inches to as big as 2.75 inches are also within the scope of the invention.

The polymers used to prepare the golf balls of the present invention include, without limitation, synthetic and natural rubbers, thermoset polymers such as thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic block copolymers including styrene-butadiene-styrene (SBS), styrene-ethylene-butylene-styrene, (SEBS) and styrene-ethylene-propylene-styrene (SEPS), styrenic terpolymers, functionalized styrenic block copolymers including hydroxylated, functionalized styrenic copolymers, and terpolymers, cellulosic polymers, liquid crystal polymers (LCP), ethylene-propylene-diene terpolymers (EPDM), ethylene-vinyl acetate copolymers (EVA), ethylene-propylene copolymers, propylene elastomers (such as those described in U.S. Pat. No. 6,525,157, to Kim et al, the entire contents of which is hereby incorporated by reference), ethylene vinyl acetates, polyureas, and polysiloxanes and any and all combinations thereof.

One preferred material which may be used to form the cover layers and/or mantle layers of the golf balls of the present invention is a block copolymer including di and triblock copolymers incorporating a first polymer block having an aromatic vinyl compound, and a second polymer block having an olefinic and/or conjugated diene compound. Preferred aromatic vinyl compounds include styrene, α-methylstyrene, o-, m- or p-methylstyrene, 4-propylstyrene, 1,3-dimethylstyrene, vinylnaphthalene and vinylanthracene. In particular, styrene and α-methylstyrene are preferred. These aromatic vinyl compounds can each be used alone, or can be used in combination of two or more kinds. The aromatic vinyl compound is preferably contained in the block copolymer in an amount of from 5 to 75% by weight, and more preferably from 10 to 65% by weight.

The conjugated diene compound, that constitutes another polymer block in the block copolymer can include for example, 1,3-butadiene, isoprene, 2,3-dimethyl-1,3-butadiene, 1,3-pentadiene and 1,3-hexadiene. In particular, isoprene and 1,3-butadiene are preferred. These conjugated diene compounds can each be used alone, or can be used in combination of two or more kinds.

Preferred block copolymers include the styrenic block copolymers such as styrene-butadiene-styrene (SBS), styrene-ethylene-butylene-styrene, (SEBS) and styrene-ethylene-propylene-styrene (SEPS). Commercial examples include SEPTON® marketed by Kuraray Company of Kurashiki, Japan; TOPRENE® by Kumho Petrochemical Co., Ltd and KRATON® marketed by Kraton Polymers. Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. One such functionalized styrenic block copolymer is SEPTON® HG-252.

Another preferred material which may be used to form the cover layers and/or mantle layers of the golf balls of the present invention is an acidic polymer that incorporates at least one type of an acidic functional group. Examples of such acidic polymers suitable for use as include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the ESCOR® 5000, 5001, 5020, 5050, 5070, 5100, 5110 and 5200 series of ethylene-acrylic acid copolymers sold by Exxon Mobil, the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-methacrylic acid copolymers such as NUCREL® 599, 699, 0903, 0910, 925, 960, 2806, and 2906 sold by DuPont.

Also included are the so called bimodal ethylene/carboxylic acid polymers as described in U.S. Pat. No. 6,562,906, the contents of which are incorporated herein by reference. These polymers comprise a first component comprising an ethylene/α,β-ethylenically unsaturated $C_{3-8}$ carboxylic acid high copolymer, particularly ethylene (meth)acrylic acid copolymers and ethylene, alkyl (meth)acrylate, (meth)acrylic acid terpolymers, having a weight average molecular weight, Mw, of about 80,000 to about 500,000, and a second component comprising an ethylene/α,β-ethylenically unsaturated $C_{3-8}$ carboxylic acid copolymers, particularly ethylene/(meth) acrylic acid copolymers having weight average molecular weight, Mw, of about 2,000 to about 30,000.

Another preferred material which may be used to form the cover layers and/or mantle layers of the golf balls of the present invention is an ionomer resin. One family of such resins was developed in the mid-1960's, by E.I. DuPont de Nemours and Co., and is sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ α,β ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a basic metal salt with metal ions selected from the group consisting of lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having a weight average molecular weight, Mw, of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with a basic metal salt with metal ions selected from the group consisting of lithium, sodium, zinc, calcium, magnesium, and a mixture of any these; and b) a low molecular weight component having a weight average molecular weight, Mw, of about from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with a basic metal salt with metal ions selected from the group consisting of lithium, sodium, potassium, magnesium, calcium, barium, lead, tin, zinc or aluminum, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers may be prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with a basic metal salt with metal ions selected from the group consisting of lithium, sodium, potassium, magnesium, calcium, barium, lead, tin, zinc or aluminum, and any and all mixtures thereof; and b) from about 5 to about 40 weight percent (based on the total weight of said modified ionomeric polymer) of one or more fatty acids or metal salts of said fatty acid, the metal salt having metal ions selected from the group consisting of lithium, sodium, potassium, magnesium, calcium, barium, lead, tin, zinc or aluminum, and any and all mixtures thereof; and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;

a) a high molecular weight component having a weight average molecular weight, Mw, of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with a basic metal salt with metal ions selected from the group consisting of lithium, sodium, potassium, magnesium, calcium, barium, lead, tin, zinc or aluminum, and any and all mixtures thereof; and b) a low molecular weight component having a weight average molecular weight, Mw, of about from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with a basic metal salt with metal ions selected from the group consisting of lithium, sodium, potassium, magnesium, calcium, barium, lead, tin, zinc or aluminum, and any and all mixtures thereof; and c) from about 5 to about 40 weight percent (based on the total weight of said modified ionomeric polymer) of one or more fatty acids or metal salts of said fatty acid, the metal salt having metal ions selected from the group consisting of lithium, sodium, potassium, magnesium, calcium, barium, lead, tin, zinc or aluminum, and any and all mixtures thereof; and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($CH_3(CH_2)_{16}COOH$), palmitic acid ($CH_3(CH_2)_{14}COOH$), pelargonic acid ($CH_3(CH_2)_7COOH$) and lauric acid ($CH_3(CH_2)_{10}COOH$). Examples of suitable unsaturated fatty acids, i.e., a fatty acid in which there are one or more double bonds between the carbon atoms in the alkyl chain, include but are not limited to oleic acid ($CH_3(CH_2)_7CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

Another preferred material which may be used to form the cover layers and/or mantle layers of the golf balls of the present invention is a multi-component blend composition ("MCBC") prepared by blending together at least three materials, identified as Components A, B, and C, and melt-processing these components to form in-situ, a polymer blend composition incorporating a pseudo-crosslinked polymer network. Such blends are more fully described in U.S. Pat. No. 6,508,725 to H. J. Kim, the entire contents of which are hereby incorporated by reference.

The first of these blend components (blend Component A) include block copolymers including di and triblock copolymers, incorporating a first polymer block having an aromatic vinyl compound, and a second polymer block having an olefinic and/or conjugated diene compound. Preferred aromatic vinyl compounds include styrene, $\alpha$-methylstyrene, o-, m- or p-methylstyrene, 4-propylstyrene, 1,3-dimethylstyrene, vinylnaphthalene and vinylanthracene. In particular, styrene and $\alpha$-methylstyrene are preferred. These aromatic vinyl compounds can each be used alone, or can be used in combination of two or more kinds. The aromatic vinyl compound is preferably contained in the block copolymer (b) in an amount of from 5 to 75% by weight, and more preferably from 10 to 65% by weight.

The conjugated diene compound, that constitutes the polymer block B in the block copolymer (b), includes, e.g., 1,3-butadiene, isoprene, 2,3-dimethyl-1,3-butadiene, 1,3-pentadiene and 1,3-hexadiene. In particular, isoprene and 1,3-butadiene are preferred. These conjugated diene compounds can each be used alone, or can be used in combination of two or more kinds.

Preferred block copolymers include the styrenic block copolymers such as styrene-butadiene-styrene (SBS), styrene-ethylene-butylene-styrene, (SEBS) and styrene-ethylene-propylene-styrene (SEPS). Commercial examples include SEPTON® marketed by Kuraray Company of Kurashiki, Japan; TOPRENE® by Kumho Petrochemical Co., Ltd and KRATON® marketed by Kraton Polymers.

Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. A preferred functionalized styrenic block copolymer is SEPTON® HG-252.

The second blend component, Component B, is an acidic polymer that incorporates at least one type of an acidic functional group. Examples of such polymers suitable for use as include, but are not limited to, ethylene/(meth)acrylic acid copolymers and ethylene/(meth)acrylic acid/alkyl (meth) acrylate terpolymers, or ethylene and/or propylene maleic anhydride copolymers and terpolymers. Examples of such polymers which are commercially available include, but are not limited to, the ESCOR® 5000, 5001, 5020, 5050, 5070, 5100, 5110 and 5200 series of ethylene-acrylic acid copolymers sold by Exxon Mobil, the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-methacrylic acid copolymers such as NUCREL® 599, 699, 0903, 0910, 925, 960, 2806, and 2906 commercially available from DuPont.

Also included are the so called bimodal ethylene/carboxylic acid polymers as described in U.S. Pat. No. 6,562,906, the contents of which are incorporated herein by reference. These polymers comprise a first component comprising an ethylene/$\alpha,\beta$-ethylenically unsaturated $C_{3-8}$ carboxylic acid high copolymer, particularly ethylene (meth)acrylic acid copolymers and ethylene, alkyl (meth)acrylate, (meth)acrylic acid terpolymers, having a weight average molecular weight, Mw, of about 80,000 to about 500,000, and a second component comprising an ethylene/$\alpha,\beta$-ethylenically unsaturated $C_{3-8}$ carboxylic acid copolymers, particularly ethylene/(meth) acrylic acid copolymers having weight average molecular weight, Mw, of about 2,000 to about 30,000.

Component C is a base capable of neutralizing the acidic functional group of Component B and typically is a base having a metal cation. These metals are from groups IA, IB, IIA, IIB, IIIA, IIIB, IVA, IVB, VA, VB, VIIA, VIIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, metal acetates, metal stearates, metal laureates, metal oleates, metal palmitates and the like.

The MCBC composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the acidic functional group of Component B is dispersed evenly throughout the mixture in either their neutralized or non-neutralized state. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

Another preferred material which may be used to form the cover layers and/or mantle layers or core layers of the golf balls of the present invention are the polyalkenamers which may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference, (the polyalkenamers although examples of a polymer produced from a cyclic olefin are distinct from the COP's used in the present invention as they are not derived from a norbornene based monomer). Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see Rubber Chem. & Tech., Vol. 47, page 511-596, 1974, which is incorporated herein by reference.

The polyalkenamer rubbers used in the present invention have a trans-content of from about 40 to about 95, preferably of from about 45 to about 90, and most preferably from about 50 to about 85 wt %, and a cis-content of from about 5 to about 60, preferably of from about 10 to about 55, and most preferably from about 15 to about 50 wt % with a melting point of greater than about 15, preferably greater than about 20 more preferably greater than about 25° C. and exhibit excellent melt processability above their sharp melting temperatures and high miscibility with various rubber additives as a major component without deterioration of crystallinity which in turn facilitates injection molding. Thus, unlike synthetic rubbers typically used in golf ball preparation, polyalkenamer-based compounds can be prepared which are injection moldable. The polyalkenamer rubbers may also be blended with other polymers and an especially preferred blend is that of a polyalkenamer and a polyamide. A more complete description of the polyalkenamer rubbers and blends with polyamides is disclosed in U.S. Pat. No. 7,528,196 in the name of Hyun Kim et al., the entire contents of which are hereby incorporated by reference.

When used to form the mantle layers or cover layers of the golf balls of the present invention the properties of the polyalkenamer such as compression, hardness and modulus may be further modified by crosslinking using the various cross linking packages well known in the golf ball art to crosslink polybutadiene for use in golf ball cores including crosslinking agents, co-crosslinking agents, peptizers and accelerators.

Suitable cross-linking agents include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2, 5-di-(t-butylperoxy)hexyne-3, such as TRIGONOX® 145-45B, marketed by Akrochem Corp. of Akron, Ohio; 1,1-bis (t-butylperoxy)-3,3,5 tri-methylcyclohexane, such as VAROX® 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Besides the use of chemical cross-linking agents, exposure of the polyalkenamer composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The polyalkenamer rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an α,β-unsaturated carboxylic acid and a metal oxide or hydroxide into the polyalkenamer composition, and allowing them to react in the polyalkenamer composition to form a metal salt. The unsaturated carboxylic acid metal salt can be blended in any desired amount, but preferably in amounts of about 10 parts to about 60 parts by weight of the unsaturated carboxylic acid per 100 parts by weight of the polyalkenamer.

The polyalkenamer compositions used in the present invention may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC® marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, and cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1S$—$SR_2$), etc.; and combinations of functional groups. Such peptizers are more fully disclosed in U.S. Pat. No. 8,030,411 in the name of Hyun Kim et al., the entire contents of which are herein incorporated by reference. A most preferred example is 2,3, 5,6-tetrachloro-4-pyridinethiol (TCPT).

The peptizer, if employed in the polyalkenamer composition, is present in an amount up to about 10, from about 0.01 to about 10, preferably of from about 0.10 to about 7, more preferably of from about 0.15 to about 5 parts by weight per 100 parts by weight of the synthetic rubber component.

The polyalkenamer compositions used to form the golf balls of the present invention may also include the various fillers as previously described herein. Especially preferred fillers include the one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER® 8012 designates a material having a trans-content of approximately 80% (and a cis-content of 20%) with a melting point of approximately 54° C.; and VESTENAMER® 6213 designates a material having a trans-content of approximately 60% (cis-content of 40%) with a melting point of approximately 30° C. Both of these polymers have a double bond at every eighth carbon atom in the ring.

Another preferred material which may be used to form the cover layers and/or mantle layers of the golf balls of the present invention is a blend of a homopolyamide or copolyamide modified with a functional polymer modifier. Illustrative polyamides for use in the polyamide blend compositions include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

Another preferred material which may be used to form the cover layers and/or mantle layers of the golf balls of the present invention is the family of polyurethanes or polyureas which are typically prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer, although mixtures of prepolymers are also contemplated.

Any isocyanate available to one of ordinary skill in the art is suitable for use according to the invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule.

As used herein, aromatic aliphatic compounds should be understood as those containing an aromatic ring, wherein the isocyanate group is not directly bonded to the ring. One example of an aromatic aliphatic compound is a tetramethylxylene diisocyanate (TMXDI). The isocyanates may be organic polyisocyanate-terminated prepolymers, low free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R preferably is a cyclic, aromatic, or linear or branched hydrocarbon moiety containing from about 1 to about 50 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis-(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-, tetramethyl-hexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene di isocyanate, m-xylylene diisocyanate, m-tetramethylxylylene di isocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates.

These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Any polyol now known or hereafter developed is suitable for use according to the invention. Polyols suitable for use in the present invention include, but are not limited to, polyester polyols, polyether polyols, polycarbonate polyols and polydiene polyols such as polybutadiene polyols. Suitable polyether polyols include polytetramethylene ether glycol; poly (oxypropylene)glycol; and polybutadiene glycol. Suitable polyester polyols include polyethylene adipate glycol; polyethylene propylene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone. The most preferred polyol is polytetramethylene ether glycol (PTMEG). Like urethane elastomers made with other ether polyols, urethane elastomers made with PTMEG exhibit good hydrolytic stability and good tensile strength. Hydrolytic stability allows for a golf ball product that is substantially impervious to the effects of moisture. Thus, a golf ball made with a polyurethane system that has an ether glycol for the polyol component will have a longer shelf life, i.e., retains physical properties under prolonged humid conditions.

Any polyamine available to one of ordinary skill in the polyurethane art is suitable for use according to the invention. Polyamines suitable for use in the compositions of the present invention include, but are not limited to amine-terminated compounds typically are selected from amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly (ethylene oxide capped oxypropylene)ether diamines, triethyleneglycoldiamines, propylene oxide-based triamines, trimethylolpropane-based triamines, glycerin-based triamines, and mixtures thereof.

The diisocyanate and polyol or polyamine components may be combined to form a prepolymer prior to reaction with a chain extender or curing agent. Any such prepolymer combination is suitable for use in the present invention.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent, and even more preferably from about 3 percent to about 9 percent, free NCO on an equivalent weight basis.

Polyol chain extenders or curing agents may be primary, secondary, or tertiary polyols. Non-limiting examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines and other suitable polyamines may be added to the compositions of the present invention to function as chain extenders or curing agents. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl- 4,4'-diamino-dicyclohexyl methane; or aromatic diamines, such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4, 4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diamino-phenyl methane, p,p'-methylenedianiline, p-phenylenediamine or 4,4'-diaminodiphenyl; and 2,4,6-tris(dimethylaminomethyl) phenol.

Depending on their chemical structure, curing agents may be slow- or fast-reacting poly amines or polyols. As described in U.S. Pat. Nos. 6,793,864, 6,719,646 and U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity speed of the polyamines.

Suitable curatives for use in the present invention are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE® 740M and polytetramethyleneoxide-di-p-aminobenzoates are sold under the trade name POLAMINES® by Polaroid Corporation. N,N'-dialkyldiamino diphenyl methane is sold under the trade name UNILINK® by UOP.

Also included as a curing agent for use in the polyurethane or polyurea compositions used in the present invention are the family of dicyandiamides as described in U.S. Pat. No. 7,879,968 filed by Kim et al., the entire contents of which are hereby incorporated by reference.

In addition to discrete thermoplastic or thermoset materials, it also is possible to modify thermoplastic polyurethane or polyurea composition by introducing materials in the composition that undergo subsequent curing after molding the thermoplastic to provide properties similar to those of a thermoset. For example, Kim in U.S. Pat. No. 6,924,337, the entire contents of which are hereby incorporated by reference, discloses a thermoplastic urethane or urea composition optionally comprising chain extenders and further comprising a peroxide or peroxide mixture, which can then undergo post curing to result in a thermoset.

Also, Kim et al. in U.S. Pat. No. 6,939,924, the entire contents of which are hereby incorporated by reference, discloses a thermoplastic urethane or urea composition, optionally also comprising chain extenders, that are prepared from a diisocyanate and a modified or blocked diisocyanate which unblocks and induces further cross linking post extrusion. The modified isocyanate preferably is selected from the group consisting of: isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethylpyrazole modified isocyanate; or mixtures of these.

Finally, Kim et al. in U.S. Pat. No. 7,037,985 B2, the entire contents of which are hereby incorporated by reference, discloses thermoplastic urethane or urea compositions further comprising a reaction product of a nitroso compound and a diisocyanate or a polyisocyanate. The nitroso reaction product has a characteristic temperature at which it decomposes to regenerate the nitroso compound and diisocyanate or polyisocyanate. Thus, by judicious choice of the post-processing temperature, further crosslinking can be induced in the originally thermoplastic composition to provide thermoset-like properties.

The polymer components of the golf balls of the present invention whether used in blends or used as a separate component of the core, cover layer or intermediate layer of the current golf balls, may be further modified by the addition of an impact modifier, which can include copolymers or terpolymers having a glycidyl group, hydroxyl group, maleic anhydride group or carboxylic group, collectively referred to as functionalized polymers. These copolymers and terpolymers may comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-dococene, 1-tetracocene, 1-hexacocene, 1-octacocene, and 1-triacontene. One or more of these α-olefins may be used.

Examples of suitable glycidyl groups in copolymers or terpolymers in the polymeric modifier include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5 diglyxidylcarboxylate, cyclohexene-4-glycidyl carobxylate, 5-norboenene-2-methyl-2-glycidyl carboxylate, and endocis-bicyclo(2,2,1)-5-heptene-2,3-diglycidyl dicarboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers.

Examples of suitable terpolymers having a glycidyl group include LOTADER® AX8900 and AX8920, marketed by Atofina Chemicals, ELVALOY® marketed by E.I. Du Pont de Nemours & Co., and REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the poly/isoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within the scope of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Atofina Chemicals; EXXELOR® VA 1803, a maleic anyhydride-modified ethylene-propylene copolymer having a maleic anyhydride content of 0.7% by weight, marketed by Exxon Chemical Co.; and KRATON® FG 1901X, a maleic anhydride functionalized triblock copolymer having polystyrene endblocks and poly (ethylene/butylene) midblocks, marketed by Shell Chemical. Preferably the functional polymer component is a maleic anhydride grafted polymers preferably maleic anhydride grafted polyolefins (for example, Exxellor VA1803).

The various polymer compositions used to prepare the golf balls of the present invention may also be further modified by addition of a monomeric aliphatic and/or aromatic amide as described in copending US Publication No. 2007-0100085 A1 filed on Nov. 1, 2006 in the name of Hyun Kim et al., the entire contents of which are hereby incorporated by reference.

Another particularly well-suited additive for use in the various polymer compositions used to prepare the golf balls of the present invention includes compounds having the general formula:

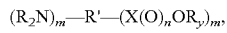

$(R_2N)_m$—R'—$(X(O)_nOR_y)_m$, where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S with the proviso that when X=C, n=1 and y=1 and when X=S, n=2 and y=1. Also, m=1-3. These materials are more full), described in U.S. Pat. No. 7,767,759 filed on Jul. 14, 2005, the entire contents of which are incorporated herein by reference.

Preferably the material is selected from the group consisting of 4,4'-methylene-bis-(cyclohexylamine)carbamate (commercially available from R.T. Vanderbilt Co., Norwalk Conn. under the tradename DIAK® 4), 11-aminoundecanoicacid, 12-aminododecanoic acid, epsilon-caprolactam; omega-caprolactam, and any and all combinations thereof.

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include antioxidants, colorants, dispersants, mold releasing agents, processing aids, plasticizers, pigments, U.V. absorbers, optical brighteners, or any other additives generally employed in plastics formulation or the preparation of golf balls and any and all combinations thereof. Although not required, UV stabilizers or photo stabilizers such as substituted hydroxphenyl benzotriazoles may be utilized in the present invention to enhance the UV stability of the final compositions. An example of a commercially available UV stabilizer is the stabilizer sold by Ciba Geigy Corporation under the tradename TINUVIN®.

The various polymeric compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers or powders, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide.

In another preferred aspect the filler comprises an aramid polymer (in the form of a powder or fiber) in order to increase the flexural modulus or hardness and to improve the impact endurance of the matle and cover layers of the golf balls of the present invention. The term "aramid" as used in the present specification means a synthetic polymeric resin generally designated in the art as an aromatic polycarbonamide. The polycarbonamides may be synthesized from the monomers 1,4-phenylene-diamine (para-phenylenediamine) and terephthaloyl chloride in a condensation reaction yielding hydrochloric acid as a byproduct. Aramid is more fully disclosed in Technical Disclosure T950,008 (950G 6, published Sep. 7, 1976, and based on an application originally filed Feb. 18, 1975) and U.S. Pat. Nos. 3,652,510; 3,699,085; and 3,673, 143. as well as the divisional patent thereof, U.S. Pat. No. 3,817,941, the disclosures of each of which are incorporated herein by reference.

Suitable aramid polymers are commercially available under tradenames including KEVLAR® (E.I. du Pont de Nemours and Company), TWARON® (Akzo Nobel), Technora (Teijin), NOMEX® and NOMEX® Z200 (E.I. du Pont de Nemours and Company), TEIJINCONEX® (Teijin), and Apial (Unitika). Materials especially suitable for use as the hardness-enhancing materials which are appropriate for the mantle or cover layers of the golf ball according to the invention include aramid fibers, such as KEVLAR®, including types PRD 29 and PRD 49.

In another preferred aspect the filler comprises one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TE and C.30EVA of Nanocor, Inc. (Arlington Heights, Ill.).

Nanofillers when added into a matrix polymer can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a 3% to 5% clay loading and has a tensile strength of 11,800 psi and a specific gravity of 1.14, while a conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating up to about 20%, or from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

The nanofiller material is added in an amount up to about 20 wt %, from about 0.1% to about 20%, preferably from about 0.1% to about 15%, and most preferably from about 0.1% to about 10% by weight (based on the final weight of the polymer matrix material) of nanofiller reacted into and substantially dispersed through intercalation or exfoliation into the structure of the polymer matrix.

In an especially preferred aspect, a nanofiller additive component in the golf ball of the present invention is surface modified with a compatibilizing agent comprising the earlier described compounds having the general formula:

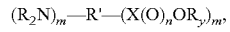

$(R_2N)_m$—$R'$—$(X(O)_nOR_y)_m$,

Preferably the material is selected from the group consisting of 4,4'-methylene-bis-(cyclohexylamine)carbamate (commercially available from R.T. Vanderbilt Co., Norwalk Conn. under the tradename DIAK® 4), 11-aminoundecanoicacid, 12-aminododecanoic acid, epsilon-caprolactam; omega-caprolactam, and any and all combinations thereof.

A most preferred aspect would be a filler comprising a nanofiller clay material surface modified with an amino acid including 12-aminododecanoic acid. Such fillers are available from Nanonocor Co. under the tradename NANOMER® 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

The cores of the golf balls of the present invention may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C. As readily appreciated by one skilled in the art, blends of polybutadiene rubbers may also be utilized in the golf balls of the present invention, such blends may be prepared with any mixture of rare earth-based catalysts, nickel-based catalysts, or cobalt-based catalysts derived materials, and from materials having different molecular weights, molecular weight distributions and Mooney viscosity.

Also included as cores used in the present invention are the so called "dual cores" which comprise (i) an interior spherical center component formed from a polybutadiene thermoset material and a second spherical component formed around the spherical center component, also formed from a thermoset material, and preferably butadiene.

The cores of the golf balls of the present invention may also include 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls are sold under the trade names RB810, RB820, and RB830 by JSR Corporation of Tokyo, Japan.

The cores of the golf balls of the present invention may also include the polyalkenamer rubbers as previously described herein and disclosed in U.S. Pat. No. 7,528,196 in the name of Hyun Kim et al., the entire contents of which are hereby incorporated by reference.

The cores of the golf balls of the present invention may also include the various fillers as previously described herein. Especially preferred fillers include the one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

When synthetic rubbers such as the aforementioned polybutadienes or polyalkenamers and their blends are used in the golf balls of the present invention they may contain further materials typically often used in rubber formulations including crosslinking agents, co-crosslinking agents, peptizers and accelerators.

Suitable cross-linking agents for use in the golf balls of the present invention include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di (tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxy-isopropyl)benzene; t-butylperoxybenzoate; 2,5-dimethyl-2, 5-di-(t-butylperoxy)hexyne-3, such as TRIGONOX® 145-45B, marketed by Akrochem Corp. of Akron, Ohio; 1,1-bis (t-butylperoxy)-3,3,5 tri-methylcyclohexane, such as VAROX® 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Each cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an α,β-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the synthetic rubber.

The core compositions used in the present invention may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC® marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, and cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, $(R_1S—SR_2)$, etc.; and combinations of functional groups. Such peptizers are more fully disclosed in U.S. Pat. No. 8,030,411 in the name of Hyun Kim et al, the entire contents of which are herein incorporated by reference. A most preferred example is 2,3,5,6-tetrachloro-4-pyridinethiol (TCPT).

The peptizer, if employed in the golf balls of the present invention, is present in an amount up to about 10, from about 0.01 to about 10, preferably of from about 0.10 to about 7, more preferably of from about 0.15 to about 5 parts by weight per 100 parts by weight of the synthetic rubber component.

The core compositions can also comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in The Vanderbilt Rubber Handbook: 13$^{th}$ Edition (1990, R.T. Vanderbilt Co.), pp. 296-330, in Encyclopedia of Polymer Science and Technology, Vol. 12 (1970, John Wiley & Sons), pp. 258-259, and in Rubber Technology Handbook (1980, Hanser/Gardner Publications), pp. 234-236. Preferred accelerators include 2-mercaptobenzothiazole (MBT) and its salts. The synthetic rubber composition can further incorporate from about 0.1 part to about 10 parts by weight of the accelerator per 100 parts by weight of the rubber. More preferably, the ball composition can further incorporate from about 0.2 part to about 5 parts, and most preferably from about 0.5 part to about 1.5 parts, by weight of the accelerator per 100 parts by weight of the rubber.

Typically the golf ball core is made by mixing together the unsaturated polymer, cross-linking agents, and other additives with or without melting them. Dry blending equipment, such as a tumbler mixer, V blender, ribbon blender, or two-roll mill, can be used to mix the compositions. The golf ball core compositions can also be mixed using a mill, internal mixer such as a Banbury or Farrel continuous mixer, extruder or combinations of these, with or without application of thermal energy to produce melting. The various core components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide and peptizer selected. The molding cycle may have a single step of molding the mixture at a single temperature for fixed time duration.

For example, a preferred mode of preparation for the cores used in the present invention is to first mix the core ingredients on a two-roll mill, to form slugs of approximately 30-40 g, and then compression-mold in a single step at a temperature between 150 to 180° C., for a time duration between 5 and 12 minutes.

The various core components may also be combined to form a golf ball by an injection molding process, which is also well known to one of ordinary skill in the art The curing time depends on the various materials selected, and those of ordinary skill in the art will be readily able to adjust the curing time upward or downward based on the particular materials used and the discussion herein.

After core formation, the various formulations for the intermediate layer and/or outer cover layer may be produced by any generally known method. The polymer(s), crosslinking agent(s), filler(s) additives and the like can be mixed together with or without melting them. Dry blending equipment, such as a tumble mixer, V-blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting. The various components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing or a combination of those, to achieve a good dispersive mixing, distributive mixing, or both. Examples of melt-mixing are roll-mill; internal mixer, such as injection molding, single-screw extruder, twin-screw extruder; or any combination of those The feed to the injection mold may be blended manually or mechanically prior to the addition to the injection molder feed hopper.

The golf ball cover and any mantle layers are typically positioned over the core using one of three methods: casting, injection molding, or compression molding. Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold Compression molding of a ball cover or mantle layer typically requires the initial step of making half shells by injection molding the layer material into an injection mold. The half shells then are positioned in a compression mold around a ball core, whereupon heat and pressure are used to mold the half shells into a complete layer over the core, with or without a chemical reaction such as crosslinking.

In an especially preferred process if a polyalkenamer composition is used to form one or more mantle layers and/or cover layers of the golf balls of the present invention, the polyalkenamer composition containing any crosslinking package is injection molded around a core in a cold mold. After the material solidifies, the ball is removed and placed into a mold, in which heat and pressure are applied to the ball to induce curing in the layer. This process is then repeated for each additional polyalkenamer layer.

Alternatively, the intermediate layers and/or outer cover layer may also be formed around the core by first forming half shells by injection molding followed by compression molding the half shells about the core to form the final ball.

The intermediate layers and/or outer cover layer may also be formed around the cores using compression molding. Cover materials for compression molding may also be extruded or blended resins or castable resins such as polyurethane.

The golf balls disclosed herein are six-piece golf balls. In other words, the golf balls include at least six separate layers (including the core). The golf ball includes a central core, an inner mantle layer, an intermediate mantle layer, an outer mantle layer, an inner cover layer and an outer cover layer.

The inner mantle layer of the golf balls of the present invention have a thickness of from about 0.010 to about 0.400, preferably from about 0.020 to about 0.200 and most preferably from about 0.030 to about 0.100 inches.

The inner mantle layer of the golf ball of the present invention has a PGA compression as measured on the golf ball precursor of less than or equal to 35, preferably less than or equal to 25, more preferably less than or equal to 15.

The inner mantle layer of the golf ball of the present invention has a flex modulus of from about 2 to about 25, more preferably of from about 3 to about 20, more preferably of from about 5 to about 15 kpsi.

The inner mantle layer of the golf ball of the present invention has a Shore D hardness as measured on the ball of greater than or equal to 25, preferably greater than or equal to 30, more preferably greater than or equal to 40 Shore D.

The intermediate mantle layer of the golf balls of the present invention have a thickness of from about 0.010 to about 0.400, preferably from about 0.020 to about 0.200 and most preferably from about 0.030 to about 0.100 inches.

The intermediate mantle layer of the golf ball of the present invention has a PGA compression as measured on the golf ball precursor of less than or equal to 35, preferably less than or equal to 30, more preferably less than or equal to 25.

The intermediate mantle layer of the golf ball of the present invention has a flex modulus of from about 2 to about 30, more preferably of from about 5 to about 25, even more preferably of from about 8 to about 25, most preferably of from about 8 to about 20 kpsi.

The intermediate mantle layer of the golf ball of the present invention has a Shore D hardness as measured on the ball of greater than or equal to 25, preferably greater than or equal to 30, more preferably greater than or equal to 40 Shore D.

The outer mantle layer of the golf ball of the present invention have a thickness of from about 0.010 to about 0.400, preferably from about 0.020 to about 0.200 and most preferably from about 0.030 to about 0.100 inches.

The outer mantle layer of the golf ball of the present invention has a PGA compression as measured on the golf ball precursor of greater than or equal to 25, preferably greater than or equal to 30, more preferably greater than or equal to 35.

The outer mantle layer of the golf ball of the present invention has a flex modulus of from about 10 to about 50, more preferably of from about 15 to about 45, more preferably of from about 20 to about 40 kpsi.

The outer mantle layer of the golf ball of the present invention has a Shore D hardness as measured on the ball of greater than or equal to 25, preferably greater than or equal to 40, more preferably greater than or equal to 45 and most preferably greater than or equal to 50 Shore D units.

The inner cover layer of the golf ball of the present invention have a thickness of from about 0.010 to about 0.400, preferably from about 0.020 to about 0.200 and most preferably from about 0.030 to about 0.100 inches.

The inner cover layer of the golf ball of the present invention has a PGA compression as measured on the golf ball precursor of greater than or equal to 60, preferably greater than or equal to 65, more preferably greater than or equal to 70.

The inner cover layer of the golf ball of the present invention has a flex modulus of from about 50 to about 80, preferably of from about 50 to about 75, more preferably of from about 55 to about 75, more preferably of from about 60 to about 70 kpsi.

The inner cover layer of the golf ball of the present invention has a Shore D hardness as measured on the ball of greater than or equal to 55, preferably greater than or equal to 60, and most preferably greater than or equal to 65 Shore D units.

The outer cover layer of the balls may have a thickness of from about 0.015 to about 0.100, preferably from about 0.020 to about 0.080, more preferably from about 0.025 to about 0.060 inches.

The outer cover layer of the golf ball of the present invention has a PGA compression of and less than or equal to 90, preferably less than or equal to 85, more preferably less than or equal to 80.

The outer cover layer of the golf ball of the present invention has a flex modulus of from about 2 to about 50, more preferably of from about 5 to about 35, more preferably of from about 7 to about 20 kpsi.

The outer cover layer the balls may also have a Shore D hardness as measured on the ball of from about 30 to about 75, preferably from 38 to about 68 and most preferably from about 40 to about 65.

The core of the golf balls of the present invention have a diameter of from about 0.50 to about 1.62, preferably of from about 0.70 to about 1.40, more preferably greater than about 0.80 to about 1.30 inches in diameter.

The core of the balls of the present invention have a PGA compression of less than or equal to 30, preferably less than or equal to 20, and most preferably less than or equal to 10.

The core of the golf balls of the present invention have a flex modulus of less than or equal to 15, preferably less than or equal to 10, more preferably less than or equal to 5 kpsi.

The core of the golf balls of the present invention has a Shore D hardness at the outer surface of less than or equal to 55, preferably less than or equal to 50, more preferably less than or equal to 45 Shore D.

The various core layers (including the center) if present may each exhibit a different hardness. The difference between the center hardness and that of the next adjacent layer, as well as the difference in hardness between the various core layers may be greater than 2, preferably greater than 5, most preferably greater than 10 units of Shore D.

In one preferred aspect, the hardness of the center and each sequential layer increases progressively outwards from the center to outer core layer.

In another preferred aspect, the hardness of the center and each sequential layer decreases progressively inwards from the outer core layer to the center.

The driver spin of the golf balls of the present invention when measured at a ball speed of 175 mph and a launch angle of 12 degrees is less than or equal to 3500, preferably less than or equal to 3300, more preferably less than or equal to 2800 rpm.

The 30 yd wedge spin of the golf balls of the present invention when measured at a ball speed of 40 mph and a launch angle of 28 degrees is greater than or equal to 6200, preferably greater than or equal to 6400, more preferably greater than or equal to 6600 rpm The 5-iron spin of the golf balls of the present invention when measured at a ball speed of 125 mph and a launch angle of 14 degrees is less than or equal to 5300, preferably less than or equal to 4900, more preferably less than or equal to 4650 rpm The COR of the golf balls of the present invention is greater than or equal to 0.700, preferably greater than or equal to 0.730, more preferably greater than or equal to 0.750, most preferably greater than or equal to 0.775, and especially greater than or equal to 0.800 at 125 ft/sec inbound velocity.

The shear cut resistance of the golf balls of the present invention is less than or equal to 4, preferably less than or equal to 3, even more preferably less than or equal to 2.

In certain embodiments, the flexural modulus ("FM") of each of the core and the mantle layers and inner and outer cover layer materials increases from the core to the inner cover layer and then the outer cover is less than the inner cover layer. In other words, an illustrative golf ball satisfies a flexural modulus gradient relationship of: FM(core)<FM(inner mantle)<FM(intermediate mantle)<FM(outer mantle)<FM(inner cover)>FM(outer cover). The flexural modulus of each successive layer may starting from the core and moving progressively outward to inner cover layer has a flexural modulus that is greater by at least 2, preferably at least 3 and more preferably at least 5 kpsi relative to the immediately adjacent inner layer.

In certain embodiments, the material Shore D hardness ("H") of each of the core and the layer materials increases from the core to the outermost mantle layer. In other words, an illustrative golf ball satisfies an increasing material Shore D hardness gradient relationship of: H(core)<H(inner mantle) <H(intermediate mantle)<H(outer mantle)<H(inner cover)>H (outer cover). The Shore D of each successive mantle layer through the inner cover layer increases by 2 or more Shore D hardness units.

In certain embodiments, the "soft feel" of the golf ball may be measured by having a specific sound frequency and loudness which imparts a softer overall sound/feel to the golf ball. Frequency is a measure of the "pitch" of the sound, and true loudness is measured in decibel (db) levels. The golf ball of the present invention has a golf ball frequency of less than or equal to 3250 Hz, more particularly less than or equal to 3200 Hz, and most particularly less than or equal to 3150 Hz. The golf ball of the present invention has a sound pressure level, S, of less than or equal to 89.5 dB, more particularly less than or equal to 89 dB, and most particularly less than or equal to 88.5 dB.

In one specific embodiment, the core comprises cis polybutadiene; the inner mantle layer, intermediate mantle layer and the outer mantle layer each individually comprise a polyalkenamer; the inner cover layer comprises an ionomer; and the outer cover layer comprises a thermoset polyurethane.

In another specific embodiment, the core comprises cis polybutadiene; the inner mantle layer, intermediate mantle layer and the outer mantle layer each individually comprise a polyalkenamer; the inner cover layer comprises a ionomer; and the outer cover layer comprises an ionomer.

In another specific embodiment, the core comprises cis polybutadiene; the inner mantle layer, intermediate mantle layer and the outer mantle layer each individually comprise a polyalkenamer; the inner cover layer comprises a modified ionomer; and the outer cover layer comprises a thermoset polyurethane.

In another specific embodiment, the core comprises cis polybutadiene; the inner mantle layer, intermediate mantle layer and the outer mantle layer each individually comprise a polyalkenamer; the inner cover layer comprises a modified ionomer; and the outer cover layer comprises an ionomer.

In another specific embodiment, the core comprises polybutadiene; the inner mantle layer and intermediate mantle layer each individually comprise a polyalkenamer; the outer mantle layer comprises a modified ionomer; the inner cover layer comprises an ionomer; and the outer cover layer comprises a thermoset polyurethane.

In another specific embodiment, the core comprises polybutadiene; the inner mantle layer and intermediate mantle layer each individually comprise a polyalkenamer; the outer mantle layer comprises a modified ionomer; the inner cover layer comprises an ionomer; and the outer cover layer comprises an ionomer.

In another specific embodiment, the core comprises polybutadiene; the inner mantle layer and intermediate mantle layer each individually comprise a polyalkenamer; the outer mantle layer comprises a modified ionomer; the inner cover layer comprises an ionomer; and the outer cover layer comprises an ionomer.

In another specific embodiment, the core comprises polybutadiene; the inner mantle layer, intermediate mantle layer and the outer mantle layer each individually comprise a polyalkenamer; the inner cover layer comprises an ionomer; and the outer cover layer comprises a polymer blend composition formed from a copolymer of ethylene and carboxylic acid as Component A, a hydroxyl-modified block copolymer of styrene and isoprene as Component B, and a metal cation as Component C; or a polymer blend composition formed from a copolymer of ethylene and carboxylic acid as Component A, a styrene-(ethylene-butylene)-styrene block copolymer as Component B, and a metal cation as Component C.

In another specific embodiment, the core comprises polybutadiene; the inner mantle layer and intermediate mantle layer each individually comprise a polyalkenamer; the outer mantle layer comprises a modified ionomer; the inner cover layer comprises an ionomer; and the outer cover layer comprises a polymer blend composition formed from a copolymer of ethylene and carboxylic acid as Component A, a hydroxyl-modified block copolymer of styrene and isoprene as Component B, and a metal cation as Component C; or a polymer blend composition formed from a copolymer of ethylene and carboxylic acid as Component A, a styrene-(ethylene-butylene)-styrene block copolymer as Component B, and a metal cation as Component C.

These and other aspects of the present invention may be more fully understood by reference to the following examples. While these examples are meant to be illustrative of golf balls and golf ball components made according to the present invention, the present invention is not meant to be limited by the following examples.

EXAMPLES

SURLYN® 8150 is an ethylene/methacrylic acid (E/MAA) copolymer, in which the MAA acid groups have been partially neutralized with sodium ions and is available from Du Pont.

SURLYN® 9150 is an ethylene/methacrylic acid (E/MAA) copolymer, in which the MAA acid groups have been partially neutralized with zinc ions and is available from Du Pont.

The various test properties which may be used to measure the properties of the golf balls of the present invention are described below including any test methods as defined below.

Core or ball diameter may be determined by using standard linear calipers or size gauge.

Compression may be measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

When a compression value is described herein for a core it is the compression as measured directly on the core itself. When a compression value is described herein for a golf ball or an outer cover layer, it is the compression as measured directly on the outer cover layer as constituted on the finished golf ball which is equivalent to a measurement on the golf ball itself. However when a compression value is quoted for a inner mantle layer, it is obtained by direct measurement on the inner mantle layer as it surrounds the golf ball construction up to the point of adding that layer i.e. the measurement is made directly on the inner mantle layer molded on the golf ball core. Similarly when a compression value is quoted for an intermediate mantle layer it is obtained by direct measurement on the intermediate mantle layer as it surrounds the golf ball construction up to that point i.e. the measurement is made on the golf ball precursor which is the core on which is molded the inner mantle layer and on which is molded the intermediate mantle layer. When a compression value is quoted for an outer mantle layer, it is obtained by direct measurement on the outer mantle layer as it surrounds the golf ball construction up to that point i.e. the measurement is made on the golf ball precursor constituted by the core on which is molded the inner mantle layer on which is molded the intermediate mantle layer on which is molded the outer mantle layer. Finally when a compression value is quoted for an inner cover layer, it is obtained by direct measurement on the inner cover layer as it surrounds the golf ball construction up to that point i.e. the measurement is made on the golf ball precursor constituted by the core on which is molded the inner mantle layer on which is molded the intermediate mantle layer on which is molded the outer mantle layer and on which is molded the inner cover layer. To further clarify this measurement as being on the golf ball precursor, this measurement is called out as being on the golf ball precursor as in for example "an inner mantle layer . . . a PGA compression as measured on the golf ball precursor of . . . ".

COR may be measured using a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec (for the tests used herein the velocity was 125 ft/sec). As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Shore D hardness may be measured in accordance with ASTM Test D2240.

Melt flow index (MFI, 12) may be measured in accordance with ASTM D-1238, Condition 230° C./2.16 kg.

Tensile Strength and Tensile Elongation were measured with ASTM D-638.

Flexural modulus and flexural strength were measured using ASTM standard D-790.

Shear cut resistance may be determined by examining the balls after they were impacted by a pitching wedge at controlled speed, classifying each numerically from 1 (excellent) to 5 (poor), and averaging the results for a given ball type. Three samples of each Example may be used for this testing. Each ball is hit twice, to collect two impact data points per ball. Then, each ball is assigned two numerical scores—one for each impact—from 1 (no visible damage) to 5 (substantial material displaced). These scores may be then averaged for each Example to produce the shear resistance numbers. These numbers may be then directly compared with the corresponding number for a commercially available ball, having a similar construction including the same core and mantle composition and cover thickness for comparison purposes.

Impact durability may be tested with an endurance test machine. The endurance test machine is designed to impart repetitive deformation to a golf ball similar to a driver impact. The test machine consists of an arm and impact plate or club face that both rotate to a speed that generates ball speeds of approximately 155-160 mph. Ball speed is measured with two light sensors located 15.5" from impact location and are 11" apart. The ball is stopped by a net and if a test sample is not cracked will continue to cycle through the machine for additional impacts. For golf balls, if zero failures occur through in excess of 100 impacts per ball than minimal field failures will occur. For layers adjacent to the outer cover, fewer impacts are required since the cover typically "protects" the inner components of the golf ball.

Golf ball Sound Pressure Level, S, in decibels (dB) and Frequency in hertz (Hz) may be measured by dropping the ball from a height of 113 in onto a marble ("starnet crystal pink") stage of at least 12" square and 4.25 inches in thickness. The sound of the resulting impact is captured by a microphone positioned at a fixed proximity of 12 inches, and at an angle of 30 degrees from horizontal, from the impact position and resolved by software transformation into an intensity in db and a frequency in Hz. Data collection is done as follows:

Microphone data is collected using a laptop PC with a sound card. An A-weighting filter is applied to the analog signal from the microphone. This signal is then digitally sampled at 44.1 KHz by the laptop data acquisition system for further processing and analysis. Data Analysis was done as follows:

The data analysis is split into two processes:
 a. Time series analysis that generates the root mean square (rms) sound pressure level (SPL) for each ball impact sound.
  i. An rms SPL from a reference calibration signal is generated in the same manner as the ball data.
  ii. The overall SPL (in decibels) is calculated from the reference signal for each ball impact sound.
  iii. The median SPL is recorded based on 3 impact tests.
 b. Spectral analyses for each ball impact sound
  i. Fourier and Autoregressive spectral estimation techniques are employed to create power spectra.
  ii. The frequencies (in cycles/sec—Hz) from highest level peaks representing the most active sound producing vibration modes of each ball are identified.

Robot Testing

The ball performance was determined using a Robot Test, which utilized a commercial swing robot in conjunction with an optical camera system to measure ball speed, launch angle, and backspin. In this test, the required golf club was attached to a swing robot, and the swing speed and power profile, as well as the tee location and club lie angle, were set-up to generate the values set forth below. A TaylorMade TP Black golf ball was used as a reference.

Example 1

A six-piece ball was prepared as follows.

The core was made by the standard process that includes mixing the polybutadiene core material with the peroxide/zinc diacrylate-based crosslinking package in a two roll mill, extruding the mixture, and then forming and curing the cores under heat and pressure in a compression molding cycle to yield a core having a diameter of 1.142 in.

An inner mantle layer made from a polyalkenamer composition was initially injection molding around the core followed by curing under heat and pressure in a compression molding cycle sufficient to result in a layer having an on the ball hardness of approximately 45 D the resulting golf ball precursor having a diameter of 1.262 in.

An intermediate mantle layer made from a polyalkenamer composition was initially injection molding around the core followed by curing under heat and pressure in a compression molding cycle sufficient to result in a layer having an on the ball hardness of approximately 55 D the resulting golf ball precursor having a diameter of 1.379 in.

An outer mantle layer made from a polyalkenamer composition was initially injection molding around the core followed by curing under heat and pressure in a compression molding cycle sufficient to result in a layer having an on the ball hardness of approximately 65 D the resulting golf ball precursor having a diameter of 1.504 in.

An inner cover layer made from a 50/50 wt % blend of Surlyn 8150 and Surlyn 9150 ionomers was then injection molded around the outer mantle layer to yield a golf ball precursor having a diameter of 1.607 in.

An outer cover layer made from a thermoset polyurethane composition (prepared by combining a prepolymer based on toluene diisocyante and polytetramethylene ether glycol and a curing agent based on diethyl toluene diamine) was then cast around the inner cover layer to yield a golf ball having a final diameter of 1.68 in.

Example 2

A six-piece ball was prepared as follows.

The core was made by the standard process that includes mixing the polybutadiene core material with the peroxide/zinc diacrylate-based crosslinking package in a two roll mill, extruding the mixture, and then forming and curing the cores under heat and pressure in a compression molding cycle to yield a core having a diameter of 1.142 in.

An inner mantle layer made from a polyalkenamer composition was initially injection molding around the core followed by curing under heat and pressure in a compression molding cycle sufficient to result in a layer having an on the ball hardness of approximately 45 D the resulting golf ball precursor having a diameter of 1.264 in.

An intermediate mantle layer made from a polyalkenamer composition was initially injection molding around the core followed by curing under heat and pressure in a compression molding cycle sufficient to result in a layer having an on the ball hardness of approximately 55 D the resulting golf ball precursor having a diameter of 1.381 in.

An outer mantle layer made from a highly neutralized ionomer, HPF 1000, was then injection molding around the intermediate mantle layer resulting in a golf ball precursor having a diameter of 1.501 in.

An inner cover layer made from a 50/50 wt % blend of Surlyn 8150 and Surlyn 9150 ionomers was then injection molded around the outer mantle layer to yield a golf ball precursor having a diameter of 1.604 in.

An outer cover layer made from a thermoset polyurethane composition (prepared by combining a prepolymer based on toluene diisocyante and polytetramethylene ether glycol and a curing agent based on diethyl toluene diamine) was then cast around the inner cover layer to yield a golf ball having a final diameter of 1.68 in.

Comparative Example 1

A five-piece ball was prepared having the analogous construction to Examples 1 and 2 but absent the inner mantle layer as follows.

The core was made by the standard process that includes mixing the polybutadiene core material with the peroxide/zinc diacrylate-based crosslinking package in a two roll mill, extruding the mixture, and then forming and curing the cores under heat and pressure in a compression molding cycle to yield a core having a diameter of 1.142 in. and a PGA compression of 16.

An inner mantle layer made from a polyalkenamer composition was initially injection molding around the core followed by curing under heat and pressure in a compression molding cycle sufficient to result in a layer having an on the ball hardness of approximately 55 D the resulting golf ball precursor having a diameter of 1.381 in. and a PGA compression of 28.

An outer mantle layer made from a polyalkenamer composition was initially injection molding around the core followed by curing under heat and pressure in a compression molding cycle sufficient to result in a layer having an on the ball hardness of approximately 65 D the resulting golf ball precursor having a diameter of 1.504 in. and a PGA compression of 43.

An inner cover layer made from a 50/50 wt % blend of SURLYN® 8150 and SURLYN® 9150 ionomers was then injection molded around the outer mantle layer to yield a golf ball precursor having a diameter of 1.607 in. and a PGA compression of 69.

An outer cover layer made from a thermoset polyurethane composition (prepared by combining a prepolymer based on toluene diisocyante and polytetramethylene ether glycol and a curing agent based on diethyl toluene diamine) was then cast around the inner cover layer to yield a golf ball having a final diameter of 1.68 in. and a PGA compression of 76.

As can be seen from the data in Table 1, the six piece balls of Examples 1 and 2 have similar properties in terms of the driver spin and 30 yard wedge spin to each other and the analogous five piece ball of Comparative Example 1. However both Examples 1 and 2 show a significant decrease in 5 iron spin as compared the analogous five piece ball of Comparative Example 1. In addition both Examples 1 and 2 show a decrease in sound frequency and hence improved feel as compared the analogous five piece ball of Comparative Example I.

When the data for Examples 1 and 2 are compared to an analogous 5-piece ball but having a higher core compression (Comp Ex 2) even greater decrease in 5-iron spin and hence longer distance is observed and an even greater decrease in sound frequency is also observed and hence further improved feel to the golfer.

TABLE 1

Ball Construction and Performance for 6-Piece Balls of the Present Invention

| | Thickness (in) | PGA Comp | Flex Mod (kpsi) | Hardness (on ball) | COR (125 ft/s) | Freq (Hz) | SPL (dB) | 5 iron spin (rpm) | Driver Spin (rpm) | 30 yd Wedge Spin (rpm) |
|---|---|---|---|---|---|---|---|---|---|---|
| Example 1 | | | | | | | | | | |
| Core | 1.142 | 6 | <5 | 41 D | 0.766 | | | | | |
| Inner mantle | 0.060 | 10 | 10 | 44 D | 0.765 | | | | | |
| Interm. mantle | 0.064 | 20 | 18 | 47 D | 0.772 | | | | | |
| Outer mantle | 0.062 | 40 | 30 | 57 D | — | | | | | |
| Inner cover | 0.051 | 72 | 65 | 68 D | 0.814 | | | | | |
| Outer cover* | 0.036 | 75 | 11 | 56 D | 0.803 | 2960 | 87.7 | 4187 | 2678 | 6891 |

TABLE 1-continued

Ball Construction and Performance for 6-Piece Balls of the Present Invention

|  | Thickness (in) | PGA Comp | Flex Mod (kpsi) | Hardness (on ball) | COR (125 ft/s) | Freq (Hz) | SPL (dB) | 5 iron spin (rpm) | Driver Spin (rpm) | 30 yd Wedge Spin (rpm) |
|---|---|---|---|---|---|---|---|---|---|---|
| Example 2 | | | | | | | | | | |
| Core | 1.142 | 6 | <5 | 41 D | 0.753 | | | | | |
| Inner mantle | 0.061 | 12 | 10 | 44 D | 0.754 | | | | | |
| Interm. mantle | 0.058 | 22 | 18 | 47 D | 0.762 | | | | | |
| Outer mantle | 0.060 | 43 | 30 | 54 D | 0.785 | | | | | |
| Inner cover | 0.051 | 74 | 65 | 68 D | 0.815 | | | | | |
| Outer cover* | 0.038 | 78 | 11 | 56 D | 0.802 | 3107 | 88.25 | 4317 | 2667 | 7024 |
| Comp Ex 1 | | | | | | | | | | |
| Core | 1.260 | 16 | 5 | 40 D | 0.770 | | | | | |
| Inner mantle | 0.060 | 28 | 18 | 47 D | 0.771 | | | | | |
| Interm. mantle | 0.060 | 43 | 30 | 54 D | 0.779 | | | | | |
| Outer mantle | 0.050 | 69 | 65 | 68 D | 0.824 | | | | | |
| Outer cover* | 0.040 | 76 | 11 | 56 D | 0.813 | 3050 | 89.4 | 4628 | 2711 | 6670 |
| Comp Ex 2 | | | | | | | | | | |
| Core | 1.260 | 34 | 5 | 46 D | | | | | | |
| Inner mantle | 0.060 | 47 | 18 | 48 D | | | | | | |
| Interm. mantle | 0.060 | 59 | 30 | 55 D | | | | | | |
| Outer mantle | 0.050 | 81 | 65 | 68 D | | | | | | |
| Outer cover* | 0.040 | 85 | 11 | 11 D | | 3430 | 89.6 | 4968 | 2729 | 7272 |

*Where appropriate, data reported for outer cover also represent final ball performance

We claim:

1. A six piece golf ball consisting essentially of;
I) a core having a center and an outer surface and having a diameter of from about 0.50 to about 1.62 in, a PGA compression of less than or equal to 30, a flex modulus of less than or equal to 15 kpsi, and a Shore D hardness as measured at said outer surface of less than or equal to 60;
II) an inner mantle layer having a thickness of from about 0.010 to about 0.400 inches, a PGA compression as measured on the golf ball precursor of less than or equal to 35, a flex modulus of from about 2 to about 25 kpsi and a Shore D hardness as measured on the ball of greater than or equal to 25;
III) an intermediate mantle layer having a thickness of from about 0.010 to about 0.400 inches, a PGA compression as measured on the golf ball precursor of less than or equal to 35, a flex modulus of from about 2 to about 30 kpsi and a Shore D hardness as measured on the ball of greater than or equal to 25;
IV) an outer mantle layer having a thickness of from about 0.010 to about 0.400 inches, a PGA compression as measured on the golf ball precursor of greater than or equal to 25, a flex modulus of from about 10 to about 50 kpsi and a Shore D hardness as measured on the ball of greater than or equal to 25;
V) an inner cover layer having a thickness of from about 0.010 to about 0.400 inches, a PGA compression as measured on the golf ball precursor of greater than or equal to 60, a flex modulus of from about 50 to about 80 kpsi and a Shore D hardness as measured on the ball of greater than or equal to 55; and
VI) an outer cover layer having a thickness of from about 0.015 to about 0.100 inches, a PGA compression as measured on the golf ball precursor of less than or equal to 90, a flex modulus of from about 2 to about 30 kpsi and a Shore D hardness as measured on the ball of from about 30 to about 75.

2. The six piece golf ball of claim 1 wherein;
I) said core has a diameter of from about 0.70 to about 1.50 in, a PGA compression of less than or equal to 20, a flex modulus of less than or equal to 10 kpsi, and a Shore D hardness as measured at said outer surface of less than or equal to 50;
II) said inner mantle layer has a thickness of from about 0.020 to about 0.200 inches, a PGA compression as measured on the golf ball precursor of less than or equal to 25, a flex modulus of from about 3 to about 20 kpsi and a Shore D hardness as measured on the ball of greater than or equal to 30;
III) said intermediate mantle layer has a thickness of from about 0.020 to about 0.200 inches, a PGA compression as measured on the golf ball precursor of less than or equal to 30, a flex modulus of from about 5 to about 25 kpsi and a Shore D hardness as measured on the ball of greater than or equal to 30;
IV) said outer mantle layer has a thickness of from about 0.020 to about 0.200 inches, a PGA compression as measured on the golf ball precursor of greater than or equal to 30, a flex modulus of from about 15 to about 45 kpsi and a Shore D hardness as measured on the ball of greater than or equal to 40;
V) said inner cover layer has a thickness of from about 0.020 to about 0.200 inches, a PGA compression as measured on the golf ball precursor of greater than or equal to 65, a flex modulus of from about 55 to about 75 kpsi and a Shore D hardness as measured on the ball of greater than or equal to 60; and
VI) said outer cover layer has a thickness of from about 0.020 to about 0.080 inches, a PGA compression as measured on the golf ball precursor of less than or equal to 85, a flex modulus of from about 5 to about 25 kpsi and a Shore D hardness as measured on the ball of from about 38 to about 68.

3. The six piece golf ball of claim 1 wherein;
I) said core has a diameter of from about 0.80 to about 1.45 in, a PGA compression of less than or equal to 20, a flex modulus of less than or equal to 5 kpsi, and a Shore D hardness as measured at said outer surface of less than or equal to 45;

II) said inner mantle layer has a thickness of from about 0.030 to about 0.100 inches, a PGA compression as measured on the golf ball precursor of less than or equal to 25, a flex modulus of from about 5 to about 15 kpsi and a Shore D hardness as measured on the ball of greater than or equal to 40;

III) said intermediate mantle layer has a thickness of from about 0.030 to about 0.100 inches, a PGA compression as measured on the golf ball precursor of less than or equal to 35, a flex modulus of from about 8 to about 25 kpsi and a Shore D hardness as measured on the ball of greater than or equal to 40;

IV) said outer mantle layer has a thickness of from about 0.030 to about 0.100 inches, a PGA compression as measured on the golf ball precursor of greater than or equal to 35, a flex modulus of from about 10 to about 50 kpsi and a Shore D hardness as measured on the ball of greater than or equal to 45;

V) said inner cover layer has a thickness of from about 0.030 to about 0.100 inches, a PGA compression as measured on the golf ball precursor of greater than or equal to 70, a flex modulus of from about 50 to about 75 kpsi and a Shore D hardness as measured on the ball of greater than or equal to 60; and VI) said outer cover layer has a thickness of from about 0.025 to about 0.060 inches, a PGA compression as measured on the golf ball precursor of less than or equal to 80, a flex modulus of from about 7 to about 20 kpsi and a Shore D hardness as measured on the ball of from about 40 to about 65.

4. The six piece golf ball of claim 3 wherein;

I) said core comprises polybutadiene, and a peptizer selected from the group consisting of an organic sulfur compound, a metal salt of an organic sulfur compound, a non-metal salt of an organic sulfur compound, and any and all combinations thereof;

II) said inner mantle layer comprises a polyalkenamer having a trans-content of from about 40 to about 95 wt %, a cis-content of from about 5 to about 60, wt %, and a melting point of greater than about 15° C. or a modified unimodal or modified bimodal ionomer;

III) said intermediate mantle layer comprises a polyalkenamer having a trans-content of from about 40 to about 95 wt %, a cis-content of from about 5 to about 60, wt %, and a melting point of greater than about 15° C. or a modified unimodal or modified bimodal ionomer;

IV) said outer mantle layer comprises a polymer selected from the group consisting of;
 a) a polyalkenamer having a trans-content of from about 40 to about 95 wt %, a cis-content of from about 5 to about 60, wt %, and a melting point of greater than about 15° C.;
 b) a modified unimodal ionomer;
 c) a modified bimodal ionomer; and
 d) all combinations of a), b) and c)

V) said inner cover layer comprises an ionomer; and

VI) said outer cover layer comprises a polymer selected from the group consisting of
 a) a thermoset polyurethane;
 b) a thermoplastic polyurethane;
 c) a thermoset polyurea;
 d) a thermoplastic polyurea;
 e) a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B); and
 f) any and all combinations thereof.

5. The golf ball of claim 4 having a frequency of less than or equal to 3250 Hz, and a sound pressure level, S, of less than or equal to 89.5 dB.

6. The golf ball of claim 1 wherein each successive layer starting from the core and moving progressively outward to inner cover layer has a flexural modulus that is greater by at least 3 kpsi relative to the immediately adjacent inner layer.

7. The golf ball of claim 1 having a flexural modulus (FM) gradient relationship such that FM(core)<FM(inner mantle)<FM(intermediate mantle)<FM(outer mantle)<FM(inner cover)>FM(outer cover).

8. The golf ball of claim 1 having a material Shore D hardness (H) gradient relationship of: H(core)<H(inner mantle)<H(intermediate mantle)<H(outer mantle)<H(inner cover)>H (outer cover).

9. The golf ball of claim 8 wherein the Shore D of each successive mantle layer through the inner cover layer increases by 2 or more Shore D hardness units.

* * * * *